Sept. 24, 1929.  R. H. CHILTON  1,729,328
RUBBER PIVOT JOINT
Filed June 4, 1926

Inventor
Ralph H. Chilton
By Spencer Sewall & Hardman
his Attorneys

Patented Sept. 24, 1929

1,729,328

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

RUBBER PIVOT JOINT

Application filed June 4, 1926. Serial No. 113,826.

This invention relates to pivot joints and has particular reference to vehicle spring shackles and the pivot joints in various controls and linkage connections in automobile construction.

An object of this invention is to provide an elastic rubber pivot joint which is inexpensive to manufacture and of improved efficiency and life in use.

A more specific object is to provide such a joint wherein the rubber material is highly compressed so that it is held in non-slipping engagement with its contacting metal parts. An advantage of this feature lies in the fact that the rubber members do not have to be vulcanized to the contacting metal parts in order to obtain a firm grip thereupon, and hence the cost of manufacture and assembly is reduced.

Another object of the invention is to provide rubber jointed spring shackles whose lateral movement or "side sway" is limited by a direct compression of the rubber.

Another object is to provide a rubber pivot joint which prevents dirt, mud, etc., from entering crevices and thereby causing rapid deterioration of the rubber material.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figures 3, 4:
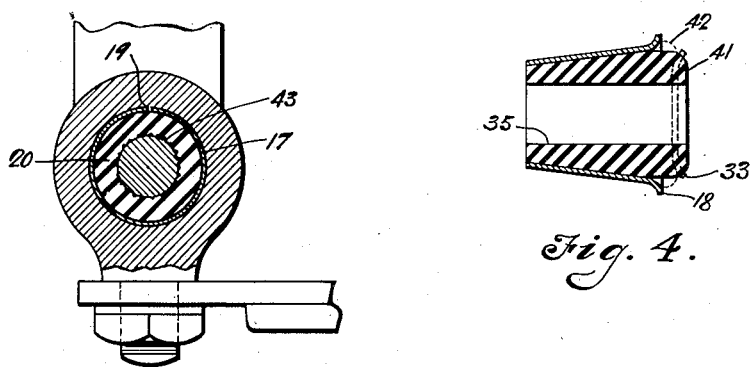
Fig. 3 is a vertical section on line 3—3 of Fig. 1.
Fig. 4 is a detail of one of the tapered elastic rubber blocks inserted within its metal sleeve. The full lines illustrate the shape of the rubber block as molded, while the dotted lines illustrate its shape after its distortion by the lateral clamping members.

Numeral 10 designates the long leaf of the rear spring of the automobile, which is connected by means of the extension shackle to the downwardly curved end member 11 integral with or fixed to the chassis side rail. An eye member 12 is rigidly fixed to the end of leaf 10 by means of the threaded shank 13, washer 14 and nut 15. Eye member 12 has an aperture 16 which tapers outwardly on both sides. Within the double tapered aperture 16 are inserted from opposite ends thereof the two correspondingly shaped metal sleeves 17 which may or may not abut at the central neck of aperture 16. These sleeves 17 preferably project endwise beyond the member 12 and have outwardly flaring flanges 18. Within the sleeves 17 are inserted the two centrally apertured elastic rubber blocks 20 which fit snugly within said sleeves 17 and abut at the center of aperture 16. The approximate shape of these rubber blocks 20 before being compressed by the lateral clamping members described hereinbelow is illustrated by full lines in Fig. 4.

The upper end member 11 is provided with similar parts to those above described. The two pivot bolts 30 first have the side link 31, the washers 32, and the outwardly flared end disks 33 threaded thereupon, after which the bolts 30 are inserted through the central apertures 35 in rubber blocks 20. The apertures 35 are of such size as to permit such insertion. The corresponding end disks 36, washers 37, and side link 38 are next placed in position and the lock washers 39 and nuts 40 placed over the projecting ends of bolts 30. The nuts 40 are then set up tight, thereby causing the two end disks 33 and 36 to clamp the rubber blocks 20 tightly therebetween and compressing the rubber from the full line configuration 41 of Fig. 4 to the dotted line configuration 42 thereof. When the rubber is thus put under compression it is pressed into tight contact with the surface of bolts 30 and sleeves 17, thereby causing a non-slipping frictional engagement between the rubber and the containing metal walls. This compression of the rubber also forces the sleeves 17 into tight engagement with the eye member 12 so that there can be no relative slipping therebetween. These sleeves 17 preferably have a longitudinal gap 19 therein (see Fig. 3) so that they can be easily expanded or contracted a small amount. This facilitates their insertion into the tapered aperture 16 and also permits them to expand in diameter to tightly grip the walls of the aperture 16 when the rubber is put under compression. Preferably during assembly the rubber blocks 20 are first inserted within sleeves 17 which may be expanded slightly to facilitate the insertion of said blocks. Then the sleeves 17 containing the rubber are pressed into the aperture 16. The bolt 30 is illustrated as having longitudinal serrations 43 therein against which the rubber is pressed, thereby giving a firm grip against relative rotary slipping between the two. The end disks 33 and 36 may fit snugly upon the serrated portion of the bolts 30 so that they are substantially non-rotatably locked thereupon but easily movable longitudinally. The side links 31 and 38 are non-rotatably locked upon the bolts 30 by any suitable means. An efficient and simple method of doing this is shown in the drawings. The slightly tapered sides of the square heads 44 of bolts 30 are clamped down within corresponding recesses 45 in the side link 31. The opposite ends of bolts 30 have flatted sides 46, the threads being upon the remaining cylindrical portion, and the side link 38 has correspondingly shaped apertures 47 which snugly receive these flatted ends of bolts 30. Preferably the flats 46 end abruptly at a shoulder 48 on bolt 30, which shoulder serves as a positive stop against which the link 38 is clamped by nuts 40. Shoulder 48 should be so located that when the nuts 40 are set up the rubber blocks 20 are under the desired compression and bulge out between the flared ends 18 of sleeves 17 and disk 36 approximately as shown at 42 in Fig. 1.

In operation, it will be obvious that the pivotal movement between the eye members and the side links will be entirely taken up by internal twist in the rubber itself and that there will be no relative slipping of one surface upon another. Hence all wear and lubrication troubles of such pivot joints are avoided. It will be noted that any lateral thrust upon the joint, such as occurs during turning corners, will be sustained by a direct compression of the rubber blocks 20. The double taper of the sleeves 17 support the blocks 20 when the thrust is from either side.

Preferably the parts of the shackle are assembled on the automobile chassis so that the normal weight load of the vehicle body will exert no initial twist on the rubber blocks 20. This can be easily done by first assembling the complete shackle to the member 11 at its proper relative angular position with no twist upon the rubber, and then properly securing the leaf 10 to the shank 13 of the eye member 12.

Figures 1, 2:
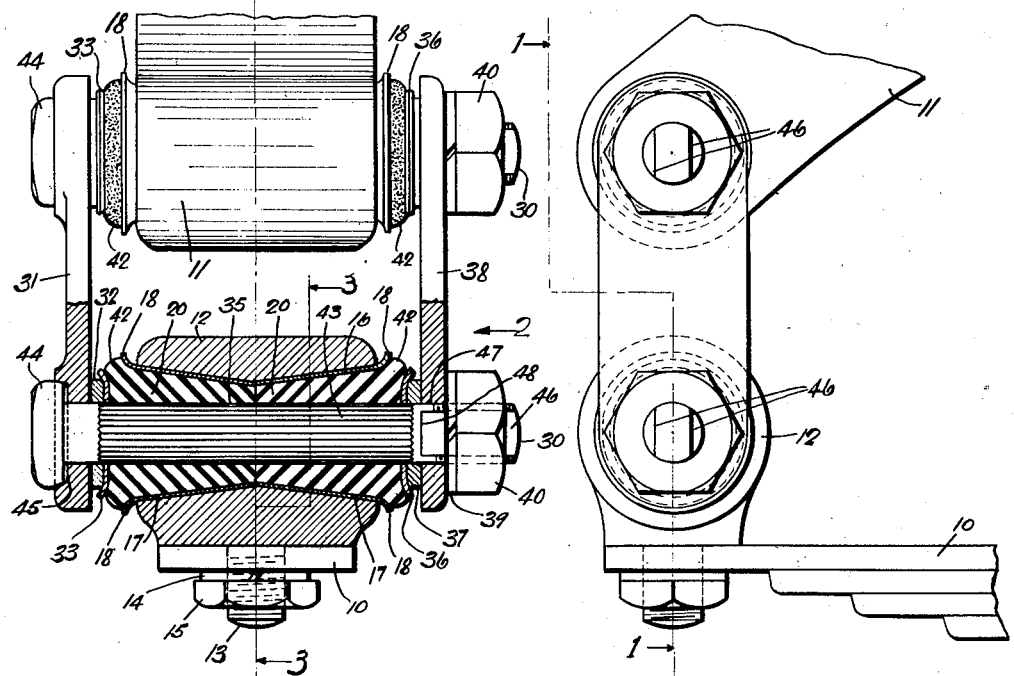
Fig. 1 is a view taken on line 1—1 of Fig. 2, and shows an automobile extension spring shackle built according to this invention.
Fig. 2 is a side elevation of the shackle.

While only a double pivot extension shackle has been illustrated and described in detail it is obvious that a single pivot shackle, such as occurs on the front end of the front automobile spring, can be represented by the lower half of Fig. 1. The two parts 31 and 38 in that case would be rigid with the side rail of the chassis frame.

While the form of embodiment of the present invention as herein disclosed, constitutes a preferred form, it is to be understood that other forms might be adopted, all coming within the scope of the claims which follow.

What I claim is as follows:

1. In combination with the spring and frame of a vehicle, a shackle comprising: eye members fixed to the spring and frame respectively and located adjacent one another, each eye having a double tapered metal sleeve therein and two correspondingly shaped elastic rubber blocks within each of said sleeves, a pin extending through said blocks in each of said eyes, and two side links interconnecting said pins and non-rotatably secured thereto.

2. In combination with the spring and frame of a vehicle, a shackle comprising: eye members fixed to the spring and frame respectively and located adjacent one another, each eye having a double tapered metal sleeve therein and two correspondingly shaped elastic rubber blocks within each of said sleeves, a pin extending through said blocks in each of said eyes, and two side links interconnecting said pins and non-rotatably secured thereto, and means for moving said side links laterally to exert pressure against the ends of said rubber blocks, whereby said blocks are put under compression.

3. In a pivot joint between two relatively movable parts, in combination, an eye member fixed to one of said parts, an expandable metal sleeve inserted therein having outwardly flaring ends projecting beyond said eye member, two correspondingly shaped elastic rubber blocks inserted in said sleeve from opposite ends thereof, an isolated pivot pin extending through said blocks and secured to the other of said parts, and means pressed against the ends of said blocks whereby the rubber is put under compression and forced in tight contact with said sleeve, and whereby said sleeve is expanded and forced into non-slipping engagement with said eye member.

4. In a pivot joint between two relatively movable parts, in combination, an eye member fixed to one of said parts, a double tapered metal sleeve inserted therein having outwardly flaring ends projecting beyond said eye member, two correspondingly shaped elastic rubber blocks inserted in said sleeve from opposite ends thereof, an isolated pivot pin extending through said blocks and secured to the other of said parts, and means pressed against the ends of said blocks whereby the rubber is put under compression and forced in tight contact with said sleeve and the outwardly flared ends thereof.

5. In a pivot joint between two relatively movable parts, in combination, an eye member fixed to one of said parts, an expandable metal sleeve inserted therein, two correspondingly shaped elastic rubber blocks inserted in said sleeve from opposite ends thereof, an isolated pivot pin extending through said blocks and secured to the other of said parts, and means pressed against the ends of said blocks whereby the rubber is put under compression and forced in tight contact with said sleeve, and whereby said sleeve is expanded into tight contact with said eye member.

6. In a pivot joint between two relatively movable parts, in combination, an eye member fixed to one of said parts, a metal sleeve inserted therein having outwardly flaring ends, two correspondingly shaped elastic rubber blocks inserted in said sleeve from opposite ends thereof, an isolated pivot pin extending through said blocks and secured to the other of said parts, and metal washers having outwardly flaring margins pressed against the ends of said blocks whereby the rubber it put under compression and forced in tight contact with said sleeve and caused to bulge out between the flared portions of said sleeve and washers.

7. In a pivot joint between two relatively movable parts, in combination, an eye member fixed to one of said parts, a metal sleeve inserted therein and having outwardly flared ends projecting beyond said eye member, two correspondingly shaped elastic rubber blocks inserted in said sleeve from opposite ends thereof, an insolated pivot pin extending through said blocks and secured to the other of said parts, and outwardly flaring end walls pressed against the ends of said blocks whereby the rubber is compressed and forced in tight contact with said sleeve and so distorted by said compression as to bulge out into the annular space between the flared portions of said sleeve and end walls.

8. In a pivot joint between two relatively movable parts, in combination, an eye member fixed to one of said parts, a thin metal sleeve having a longitudinal split therein and outwardly flared ends inserted in said eye member, two correspondingly shaped elastic rubber blocks inserted in said sleeve from opposite ends thereof, an isolated pivot pin extending through said blocks and secured to the other of said parts, and outwardly flaring end walls non-rotatably fixed to said pin and pressed against the ends of said blocks, whereby the rubber is compressed into tight contact with its confining metal walls and caused to bulge outwardly between the opposed flared ends of said sleeve and end walls.

9. In a pivot joint between two relatively movable parts, in combination, an eye member fixed to one of said parts, an expandible metal sleeve inserted therein, two correspondingly shaped elastic rubber blocks inserted in said sleeve from opposite ends thereof, an isolated pivot pin extending through said blocks and secured to the other of said parts, and end walls fixed to said pivot pin and pressed against the ends of said blocks whereby the rubber is compressed and said sleeve expanded into tight contact with the inner walls of said eye member.

10. A pivot joint between two relatively rotatable parts comprising: a sleeve member fixed to one of said parts, an inner pivot member extending through said sleeve and secured to the other of said parts, elastic rubber material inserted between and isolating said pivot member from said sleeve, said pivot member having a roughened surface, and end walls pressed against the ends of the elastic material to highly compress same and cause it to grip the contacting metal surfaces with a non-slipping grip.

11. In combination with the spring and chassis frame of an automobile, a shackle interconnecting the spring end and frame comprising: double tapered eye members fixed to the spring and frame respectively transversely to the length of the spring, two parallel inner pivot pins extending through said two eye members but isolated therefrom by elastic rubber material, two side links non-rotatably fixed to the ends of said pivot pins, and metal end walls interposed between the elastic rubber and said side links and means for forcing said end walls laterally against said elastic rubber to retain said rubber under compression at all times.

12. In combination with the spring and frame of a vehicle, an extension shackle comprising: eye members fixed to said spring and frame, respectively, the apertures in said eye members being restricted at their central portion, two elastic rubber blocks inserted into each of said eyes from opposite ends thereof, a pivot pin extending through said blocks in each of said eyes, two side links interconnecting said pins and non-rotatably fixed to the projecting ends of said pins, and means for retaining said side links compressed laterally against the ends of said rubber blocks whereby to cause said rubber blocks to grip said pins and eyes.

In testimony whereof I hereto affix my signature.

RALPH H. CHILTON.